US011188555B2

(12) United States Patent
Shilimkar et al.

(10) Patent No.: US 11,188,555 B2
(45) Date of Patent: Nov. 30, 2021

(54) ISOLATING A NETWORK STACK FOR PLUGGABLE DATABASES

(71) Applicant: Oracle International Corporation, Redwood Shores, CA (US)

(72) Inventors: Santosh Shilimkar, San Jose, CA (US); Nagarajan Muthukrishnan, Foster City, CA (US); Ravi Thammaiah, Redwood City, CA (US); Sumanta Chatterjee, Menlo Park, CA (US); Binoy Sukumaran, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 414 days.

(21) Appl. No.: 16/157,015

(22) Filed: Oct. 10, 2018

(65) Prior Publication Data
US 2020/0117743 A1    Apr. 16, 2020

(51) Int. Cl.
*G06F 16/25* (2019.01)
*G06F 9/455* (2018.01)
*G06F 16/21* (2019.01)
*G06F 16/27* (2019.01)
*G06F 16/28* (2019.01)

(52) U.S. Cl.
CPC ........ *G06F 16/256* (2019.01); *G06F 9/45558* (2013.01); *G06F 16/21* (2019.01); *G06F 16/27* (2019.01); *G06F 16/28* (2019.01); *G06F 2009/45595* (2013.01)

(58) Field of Classification Search
CPC ........ G06F 16/256; G06F 16/21; G06F 16/27; G06F 16/28; G06F 9/45558; G06F 2009/45595
See application file for complete search history.

(56) References Cited

U.S. PATENT DOCUMENTS

| 8,028,071 | B1 * | 9/2011 | Mahalingam | G06F 9/45558 709/227 |
|---|---|---|---|---|
| 2002/0053032 | A1 * | 5/2002 | Dowling | H04L 29/0602 726/15 |
| 2004/0250252 | A1 * | 12/2004 | Khartabil | G06F 9/545 719/310 |
| 2011/0307544 | A1 * | 12/2011 | Lotlikar | G06F 9/468 709/203 |
| 2014/0095530 | A1 * | 4/2014 | Lee | G06F 16/211 707/769 |
| 2016/0085963 | A1 * | 3/2016 | Birnbaum | G06F 9/45558 726/30 |

* cited by examiner

*Primary Examiner* — Jensen Hu
(74) *Attorney, Agent, or Firm* — Hickman Becker Bingham Ledesma LLP (57) ABSTRACT

Techniques are described herein for isolating a network stack in a multitenant container DBMS. A first and second pluggable database are established within a container database. A first network stack is assigned to the first pluggable database and a second network stack is assigned to the second pluggable database. A request is received to connect to the first pluggable database and a connection is established to the first pluggable database using the first network stack. A request is received to connect to the second pluggable database and a connection is established to the second pluggable database using the second network stack.

16 Claims, 6 Drawing Sheets

ISOLATING A NETWORK STACK FOR PLUGGABLE DATABASES

FIELD OF THE INVENTION

The present invention relates to isolating a network stack for pluggable databases held within a container database. The present invention more specifically relates to a multi-node database management system that allows a pluggable database to be accessed through its own network stack even when multiple pluggable databases are held by a single container database.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.
Database Systems A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session process may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

Database processes also include "database server system" processes which provide services and/or perform functions on behalf of the entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedures arguments, and the return data type and the data types of the arguments, and may include source code and a compiled version thereof.

A database object may be defined by the database dictionary, but the metadata in the database dictionary itself may only partly specify the properties of the database object. Other properties may be defined by data structures not considered part of the database dictionary. For example, a user defined function implemented in a JAVA class may be defined in part by the database dictionary by specifying the name of the user defined function and by specifying a reference to a file containing the source code of the Java class (i.e. .java file) and the compiled version of the class (i.e. .class file).

Multitenant Architecture

A container DBMS is a powerful mechanism for database consolidation. A container DBMS provides a high degree of computer resource sharing while concurrently providing a high degree of isolation. A container DBMS is based on a "container". A container is a collection of schemas, objects, and related structures in a multitenant container database (CDB) that appears logically to an application as a separate database. Within a CDB, each container has a unique ID and name. The root database and every pluggable database (PDB) is considered a container. A container DBMS may contain numerous PDBs. PDBs isolate data and operations so that from the perspective of a user or application, each PDB appears as if it were a traditional non-CDB. Each PDB is defined by its own separate database dictionary, defining database objects within the PDB. A user may access a PDB within a container DBMS by establishing a database session for a PDB.

A CDB enables computer resource amortization ("resource amortization"). The computer resources required to provision and host a PDB are in effect amortized between the multiple PDBs within a CDB. The computer resources needed per PDB are thereby reduced.

Database server system processes are not dedicated on a per PDB basis, but rather serve multiple PDBs within a CDB. The overhead of database server system processes is thereby amortized across the multiple PDBs in the CDB.

A container DBMS provides isolation, at least to a degree. Database sessions established for a PDB may be limited to accessing or otherwise viewing database objects defined for the PDB by the PDB's dedicated database dictionary.

A container DBMS may implement various levels of isolation. While database objects may be isolated between database sessions of different PDBs, various computing resources may be shared across the database sessions. Hosting multiple PDBs on the same database server thus allows the computing resources of database servers or instances to be shared between multiple PDBs.

Using a multitenant architecture, a server with a single operating system instance is used to run multiple CDBs and PDBs. By using a single operating system instance, resources in the operating system may be shared, including network resources such as a network stack. The network stack is a set of resources an operating system makes available to one or more processes spawned by the operating system. The set of resources include a private set of IP addresses, routing table, socket list, connection tracking table, firewall, network devices, and other network-related resources.

If a tenant in a multitenant architecture desires to have a set of custom firewall or whitelisting rules, it is not always feasible to apply them in a single network stack due to complications with other tenants that share that network stack. Additionally, sharing a network stack between multiple tenants exposes network vulnerabilities to malicious tenants. Processes belonging to one tenant can potentially access other tenant database processes, tamper with resources, and interfere with execution. Described herein are techniques for isolating a network stack in a multitenant container RDBMS.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Among the resources that can be shared between multiple PDBs in a container DBMS is a network stack. The pluggable database sessions of each of the multiple PDBs can share the same network stack, that is, the operating system of the DBMS makes the same network stack available to the processes running within each of the database sessions.

To provide tenants who reside in a multi-tenant container database architecture greater isolation and more network resource flexibility and customization, separate isolated network stacks are provided for each PDB or group of PDBs by assigning and otherwise providing a separate and different network stack to the database sessions of a PDB or group PDBs.

By isolating a network stack for a PDB or group of PDBs, clients that wish to connect can directly connect to the PDB or group of PDBs by using a unique IP address provided by the respective network stack. Additionally, having separate network stacks per PDB or group of PDBs makes it possible to have custom network settings for each group without adding additional network hardware. Additionally, separate network stacks allow customer-specific firewall IP rules without the need to have separate virtual machines hosting databases, which enables whitelisting or restricted access control of application hosts connecting to certain databases. In short, separate network stacks allow the customization of TCP/IP stack configuration for individual PDBs.

As noted previously, the embodiments of the invention are implemented within a container DBMS. A brief description of a container DBMS is therefore useful.

General Operating Environment

Figure 1:
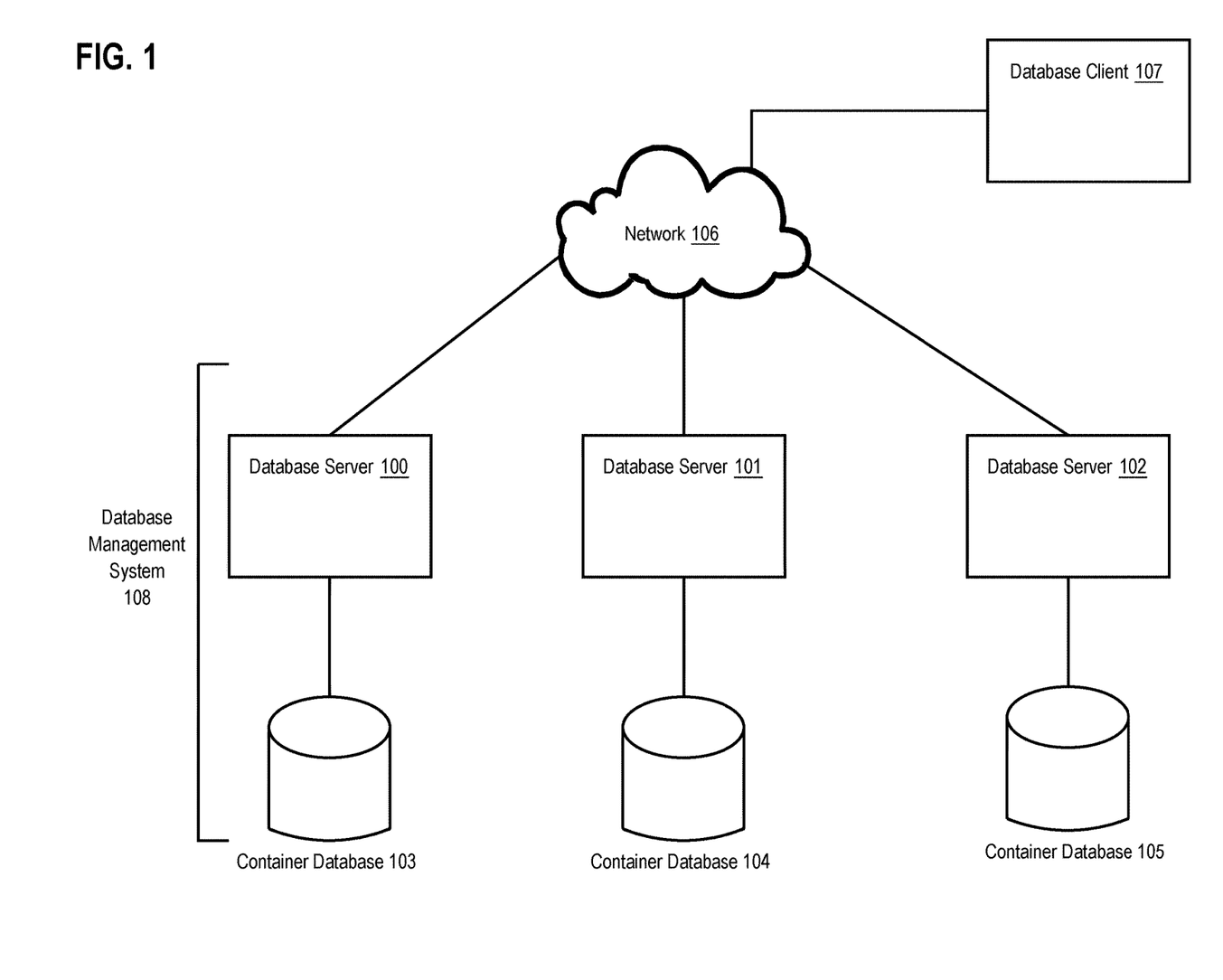
FIG. 1 illustrates an example computer-networking environment upon which an embodiment may be implemented.

FIG. 1 illustrates an example computer-networking environment upon which an embodiment may be implemented. Although FIG. 1 only depicts a particular number of each element, a practical environment may have many more, perhaps hundreds or thousands, of each of the elements illustrated in FIG. 1.

In FIG. 1, database server 100, database server 101, and database server 102 (collectively "the database servers") each represent a combination of software and resources on one or more computing devices that are communicatively coupled to their respective databases (container database 103, container database 104, and container database 105 respectively) and are communicatively coupled to each other via network 106 and also to database client 107. Container database 103, container database 104, and container database 105 are collectively referred to as "the container databases". An example of a computing device upon which the database servers may be implemented is described below in the "Hardware Overview". In some embodiments, the database servers are configured to accept user commands, such as queries, Data Definition Language (DDL), and Data Manipulation Language (DML) instructions, and carry out those commands on their respective container database.

In an embodiment, network 106 represents one or more local networks, wide area networks, internetworks, or service provider networks. In some embodiments, network 106 represents the Internet.

In an embodiment, the database client 107 represents a combination of software and resources on one or more computing devices which implements one or more applications that send commands to the database servers in order to retrieve, modify, delete, or submit data stored by the container databases. An example of a computing device upon which the database servers may be implemented is described below in the "Hardware Overview".

Container Database

Figure 2:
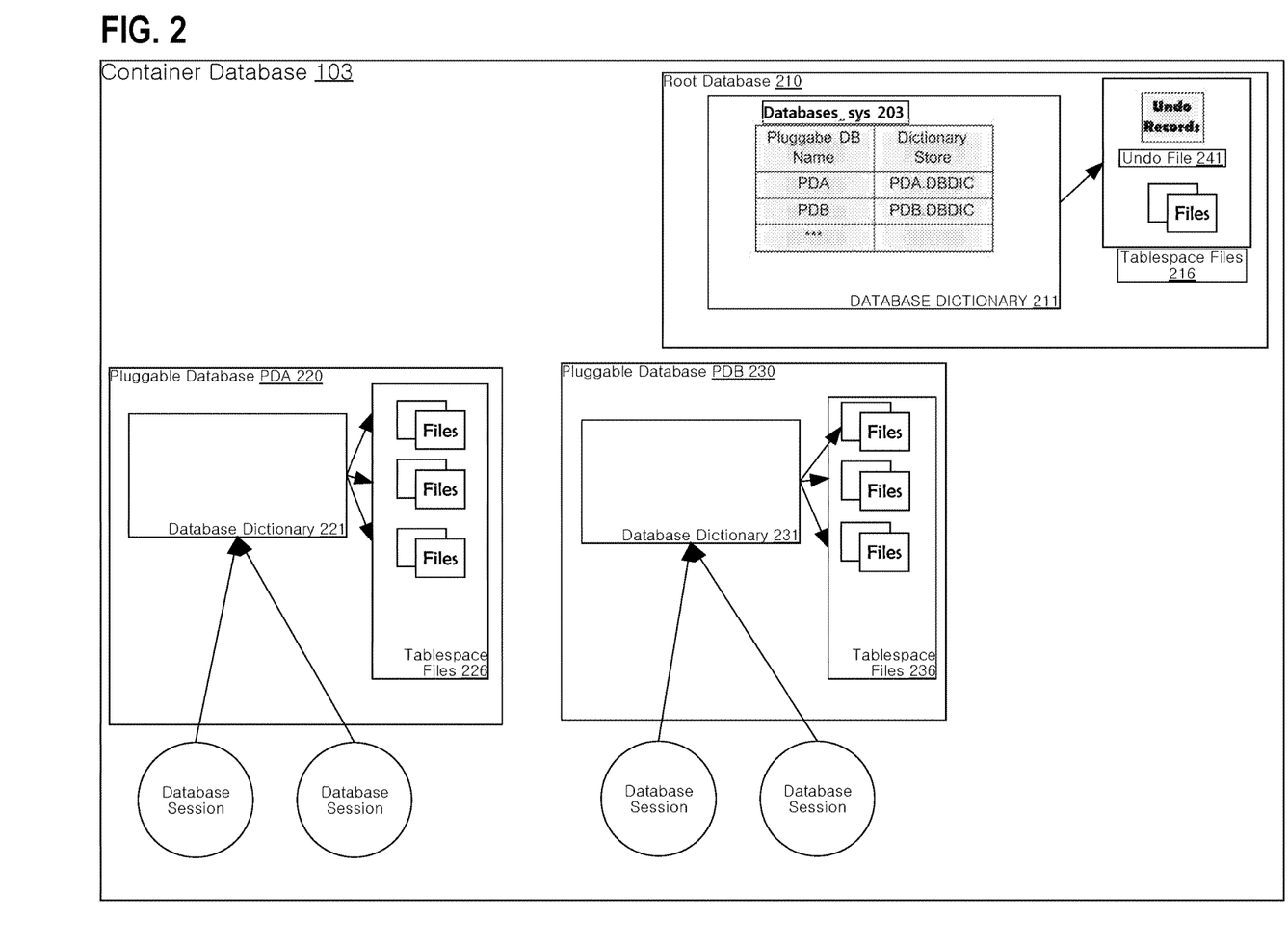
FIG. 2 is a diagram depicting a Container Database according to an embodiment of the present invention.

FIG. 2 illustrates an example structure for a general container database according to an embodiment. In order to illustrate clear examples, FIG. 2 is described with respect to container database 103, but the description also applies to container database 104 and container database 105 as well.

Container database 103 contains multiple databases that are hosted and managed by database server 100. The databases include pluggable database PDA 220 and pluggable database PDB 230, and root database 210, which is associated with pluggable database PDA 220 and pluggable database PDB 230, as shall be explained in greater detail below. In other embodiments, the container database 103 may contain more pluggable databases than the number of pluggable databases that are depicted in FIG. 2. However, due to inherent hardware limitations, some implementations may set an upper limit on the number of pluggable databases that the container database 103 can support. Root database 210 is a database that is used by the database server 100 to globally manage container database 103, and to store metadata and/or data for "common database objects" that are accessible to users of the member PDBs.

Pluggable database PDA 220 includes database dictionary 221. Data for database objects of pluggable database PDA 220 is stored in tablespace files 226.

Pluggable database PDB 230 includes database dictionary 231. Tablespace Files 236 store data for database objects of pluggable database PDB 230.

The database server 100 responsible for the container database 103 may establish database sessions for the root database 210 or any of the member pluggable databases. The database dictionary of the PDB for which the database session is established determines the scope of the commands issued by database client 107 (e.g., which database(s) the command will be executed on), which permissions are checked, which database dictionaries will be used for the session, and so forth.

Root Database

Root database 210 is a database used by database server 100 to globally manage the container database 103. An important function facilitated by root database 210 is to define pluggable databases within the container database 103. Similar to pluggable databases, the root database 210 includes a database dictionary 211. The database dictionary of a root database may be referred to herein as a root database dictionary. Database dictionary 211 contains metadata that defines various aspects of the container database 103 needed to administer container database 103 and the pluggable databases contained therein. Data for database objects defined by database dictionary 211 is stored in tablespace files 216.

Database dictionary 211 defines pluggable databases within the container database 103 as well as aspects or properties of a pluggable database. The attribute Pluggable DB is a name or label for a pluggable database.

Pluggable Database Session

A user may access a PDB in Container Database 103 by submitting a connection request that identifies the PDB. In response to receiving the request, database server 100 establishes a database session for the PDB. Establishing the database session for the PDB entails establishing the database dictionary of the PDB as the database dictionary for the database session. Once the PDB dictionary is established as a database dictionary of the PDB, access is isolated to the database objects of the PDB, and to common database objects of the root database, as shall be described in further detail. Establishing the PDB dictionary as a database dictionary for a database session may be referred to herein as attaching the database dictionary to the database session.

A database server registers, with a connection manager, information indicating that a PDB is available for new connections. When the connection manager receives a request for a new connection to access a PDB, the connection manager forwards the request for a new connection to the database server hosting the PDB. The database server may then establish a database session for the PDB requested by the connection request. More information about establishing database sessions in response to connection requests can be found, for example, in U.S. Pat. No. 8,713,186, the entire contents of which are incorporated herein.

With respect to the PDB objects in the one or more PDBs of a container database, execution of database commands issued to a database session attached to a PDB dictionary can only access PDB objects that are defined by the PDB dictionary. Consequently, access by users of the database session may be restricted to accessing PDB objects that are defined by the attached PDB dictionary, thereby isolating database access to PDB objects to those in the respective PDB. This isolation not only applies to end users but may also apply to administrators of a PDB.

For example, in response to a connection request for access to Pluggable Database PDA 220, Database Dictionary 221 is attached to the database session. Database commands issued in the database session are executed against Database Dictionary 221. Access to pluggable database objects through Data Manipulation Language (DML) and Data Definition Language (DDL) commands issued in the database session is isolated to pluggable database objects defined by Database Dictionary 221. Isolation by concurrently executing database sessions with Pluggable Database PDA 220 or Pluggable Database PDB 230 is achieved in the same manner.

Namespaces

According to an embodiment, a network stack is implemented through the use of an operating system namespace. Operating systems such as Linux support isolation features such as namespaces. Namespaces are a feature that a number of operating systems, such as Linux, support to isolate the running of a number of processes from other processes running within the same computer system. Operating system kernels such as Linux provide the ability to programmatically create different types of "namespaces" such as "process identification" namespaces and "network" namespaces. Upon creation of a "process identification" or "PID" namespace, for example, processes that belong to the namespace can only see other processes that have been created in the same namespace. Other operating systems also support isolation features such as namespaces. Additional non-limiting examples of operating systems that include network isolation features such as namespaces are Solaris Zones and Windows Server Containers.

Similarly, upon creation of a "network" namespace, processes that belong to the namespace can only see network sockets, bound ports, interfaces, routing table, etc. that are defined for the namespace. Creating a namespace in effect creates a network stack. Processes within a network namespace are limited to their own set of network sockets, bound ports, interfaces, routing table, etc. that are defined for the namespace.

Network namespaces partition the use of the network—devices, addresses, ports, routes, firewall rules, etc.—into separate logical boxes, essentially virtualizing the network within a single running kernel instance. Each network namespace has its own network devices, IP addresses, TCP/UDP ports and routing tables. Each network namespace may be configured with unique routing tables and/or firewall rules. Each network namespace provides a copy of the network stack, as described herein.

Other processes outside of the network namespace cannot access these network resources and do not even know the network resources exists. Furthermore, a process assigned a namespace cannot monitor or view traffic related to another network namespace.

Operating systems such as Linux provide several other kinds of namespaces. For example, the mount namespace isolates a process from a mounted filesystem. The mount namespace is the set of mounted filesystems that a process can access. The set may be different from a process running natively on the host or a process running in another namespace, which may have its own mounted filesystem set. A process within a mount namespace can change its set of mount file systems without affecting processes running outside of the namespace.

The UTS namespace allows a single system to appear to have different host and domain names to different processes. The UTS namespace isolates the hostname and the Network Information Service (NIS) domain name. The hostname in a namespace can be changed without affecting the hostname of the host itself. The UTS namespace may be used to isolate hostnames.

The IPC namespace isolates certain inter-process communication resources such as the Portable Operating System Interface (POSIX) message queues and System V Interprocess Communication (IPC) mechanisms. IPC namespaces isolate processes from System V style inter-process communication. This prevents processes in different IPC namespaces from using, for example, the shared memory (SHM) family of functions to establish a range of shared memory between the two processes. Instead, each process can use the same identifiers for a shared memory region and produce two such distinct regions.

The PID namespace isolates the process ID number space, meaning that processes in different PID namespaces can have the same PID. With PID namespaces, a single process can have multiple PIDs associated with it, one for each namespace it falls under. PID namespaces are nested, meaning when a new process is created it will have a PID for each namespace from its current namespace up to the initial PID namespace. Hence, the initial PID namespace is able to see all processes, albeit with different PIDs than other namespaces will see processes with. PID namespaces allow containers to provide functionality such as suspending/resuming the set of processes in the container and migrating the container to a new host while the processes inside the container maintain the same PIDs.

A user namespace isolates user IDs and group IDs between a host and containers. The user namespace allows a process to have root privileges within a namespace, without giving it that access to processes outside of the namespace. Additionally, a user namespace provides both privilege isolation and user identification segregation across multiple sets of processes. Like the PID namespace, user namespaces are nested and each new user namespace is considered to be a child of the user namespace that created it. A user namespace contains a mapping table that converts user IDs from a container's point of view to the system's point of view. This allows, for example, the root user to have user id 0 in the container but is actually treated as user id 1,800,000 by the system for ownership checks.

Isolating a Network Stack for a Pluggable Database

Figure 3:
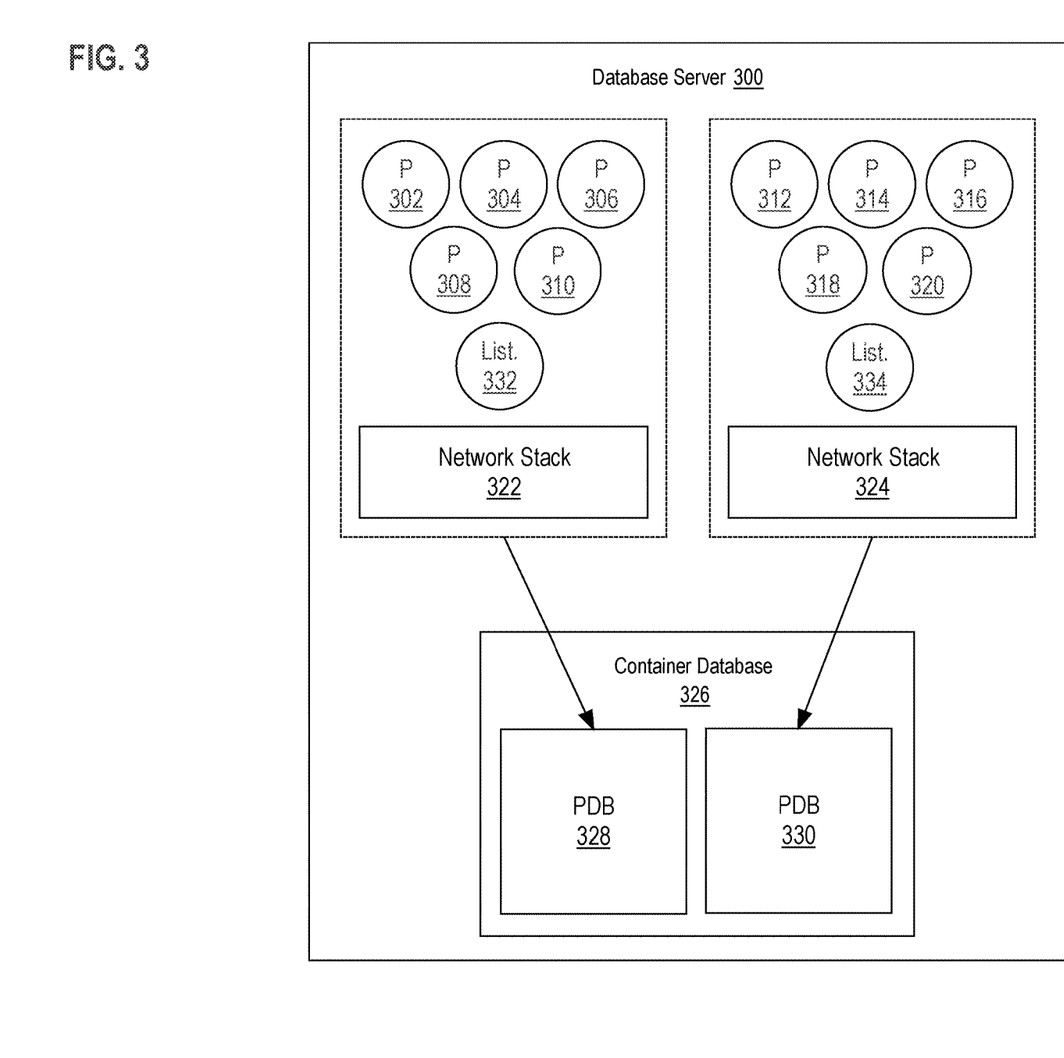
FIG. 3 illustrates an example computing environment that isolates a network stack for a pluggable database according to an embodiment.

FIG. 3 illustrates an example computing environment that isolates a network stack for a PDB according to an embodiment. Although FIG. 3 only depicts a particular number of each element; a practical environment may have many more, perhaps hundreds or thousands, of each of the elements illustrated in FIG. 3.

In FIG. 3, database server 300 manages container database 326 which includes PDBs 328 and 330. Database sessions 302-310 are established for accessing PDB 328 and database sessions 312-320 are established for accessing PDB 330. Database sessions 302-310 execute within network stack 322. That is, the database processes running within each of database sessions 302-310 are assigned a network stack 322. Similarly, database sessions 312-320 execute within network stack 324. In an embodiment, a network stack is implemented as a network namespace assigned to a database process of a database session.

PDB listener processes 332 and PDB listener process 334 are processes that receive connection requests for a database session for a particular PDB. The connection requests are forwarded to the PDB listener by a connection manager running on database server 300.

Before a database session for a PDB may be established, a PDB listener process is spawned or otherwise started by database server 300. Spawning the PDB listener process entails associating the PDB listener process with a network stack.

According to an embodiment, database server 300 associates the PDB listener process with a network stack defined for the PDB by a database dictionary. For example, the database dictionary may reference by name a network stack defined by the operating system and associate the network stack with the PDB. Specific properties for the network stack may be stored in an operating system store, accessible, for example, in Linux using the file descriptor "/run/netns/".

The connection manager routes client connection requests and assists in establishing database sessions to PDBs. A user may submit a connection request for a specific PDB to database server 300. The request is received at the connection manager, which then routes the request to a listener process for the PDB.

A PDB listener process listens for new connections requests. The PDB listener process spawns a new database session process for a connection request. Because the PDB listener process spawns the new process, the new process only has the network stack of the PDB listener process, which is the network stack for the PDB.

Once a database session is established and assigned to a network stack, clients that wish to connect to a PDB can interact with the database session using a unique IP address provided by the network stack defined for the PDB. Additionally, having separate network stacks per PDB or group of PDBs makes it possible to configure custom network settings at a PDB level of granularity within a database server. Separate network stacks allow customer-specific firewall IP rules for a PDB without need to have separate virtual machines hosting databases. This enables whitelisting or restricted access control of application hosts connecting to certain PDBs. Furthermore, separate network stacks allow for configuring network bandwidth distribution across PDBs.

By isolating a network stack for each tenant of a multi-tenant database, each tenant of a PDB has its own network stack and can customize Address Resolution Protocol (ARP) tables, add network filters, custom TCP window size, and tuning congestion algorithms. Custom Simple Network Management Protocol (SNMP) traps can be set to get notifications and also monitor the network. Isolated network stacks also provide security improvements. For example, when every tenant or group of tenants in a multitenant database gets its own network stack, network packets related to a tenant associated with a finance department PDB cannot be sniffed by a tenant or group of tenants associated with an IT department PDB because of the network isolation that this technique provides. Even though some resources may be shared between tenants or groups of tenants, by providing a separate network stack for each tenant or group of tenants, vulnerabilities exposed by sharing a single network stack between tenants are eliminated.

Without the ability to assign the set of database sessions of PDB the set's own individual network stack, network isolation and other benefits described about would have to be obtained using alternatives that require a greater cost of computer resources. For example, network isolation could be achieved by hosting a PDB in a CDB within a virtual machine or hardware platform dedicated to the PDB. Deploying a PDB in this manner eliminates or reduces resource amortization.

Example Procedure

Figure 4:
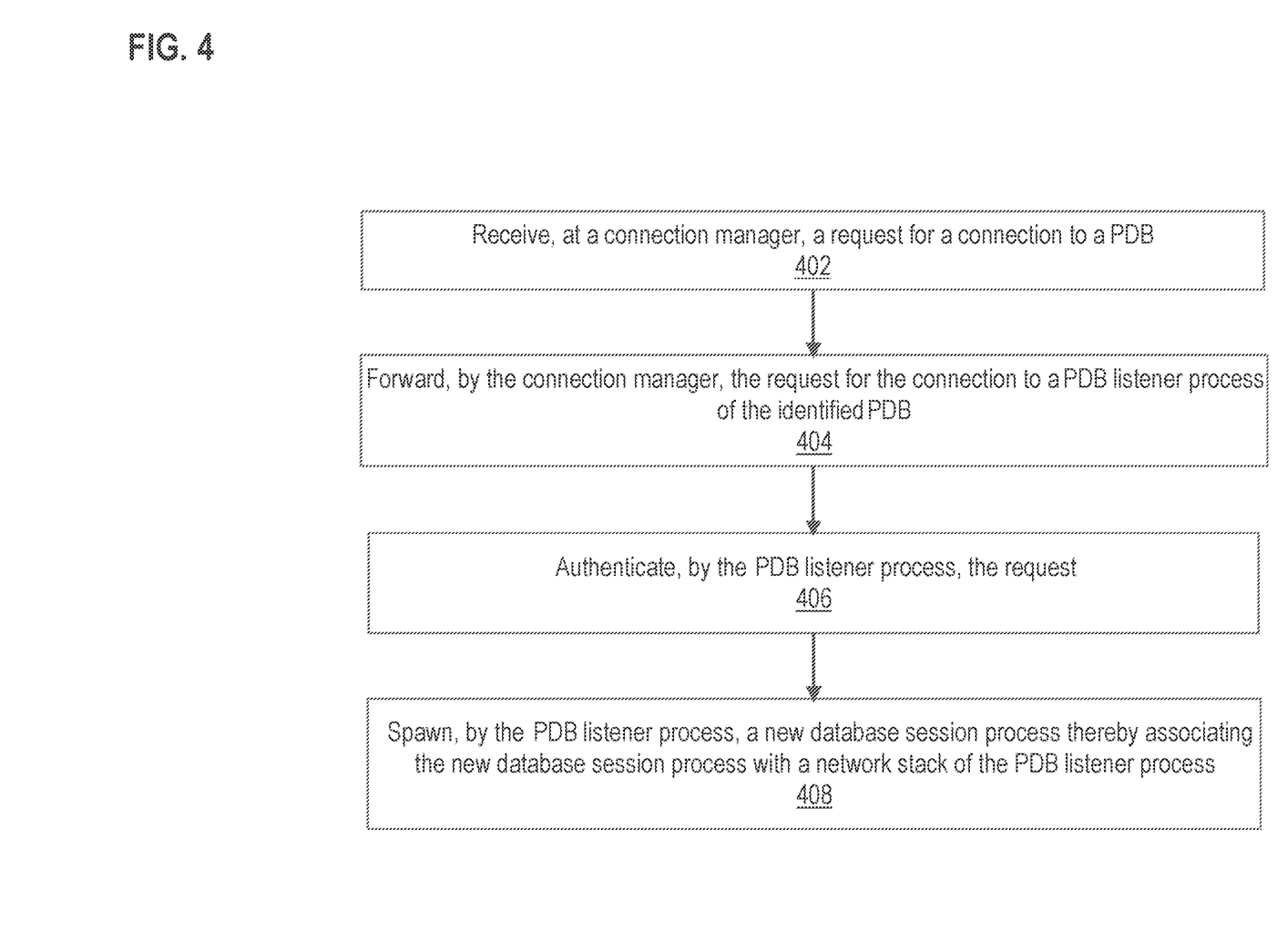
FIG. 4 is a flow chart depicting an example procedure for isolating a network stack for pluggable databases.

FIG. 4 illustrates an example procedure for isolating a network stack for PDBs. For the purposes of illustration, the procedure flow depicted in FIG. 4 is discussed using DBMS 108.

At step 402, the connection manager receives a request for a connection to a PDB. Parameter values may be included in conjunction with the connection request, which include a database identifier for the PDB. The database identifier may be any information that is usable to identify a database for which access is being requested. In an embodiment, the database identifier may be the name of a PDB. In another embodiment, the database identifier may be a database service associated with a PDB.

At step 404, the connection manager forwards the request for the connection to a PDB listener process of the identified PDB.

At step 406, the PDB listener process authenticates the request.

At step 408, the PDB listener process spawns a new database session process, thereby associating the new database session process with a network stack of the PDB listener process.

Software Overview

Figure 5:
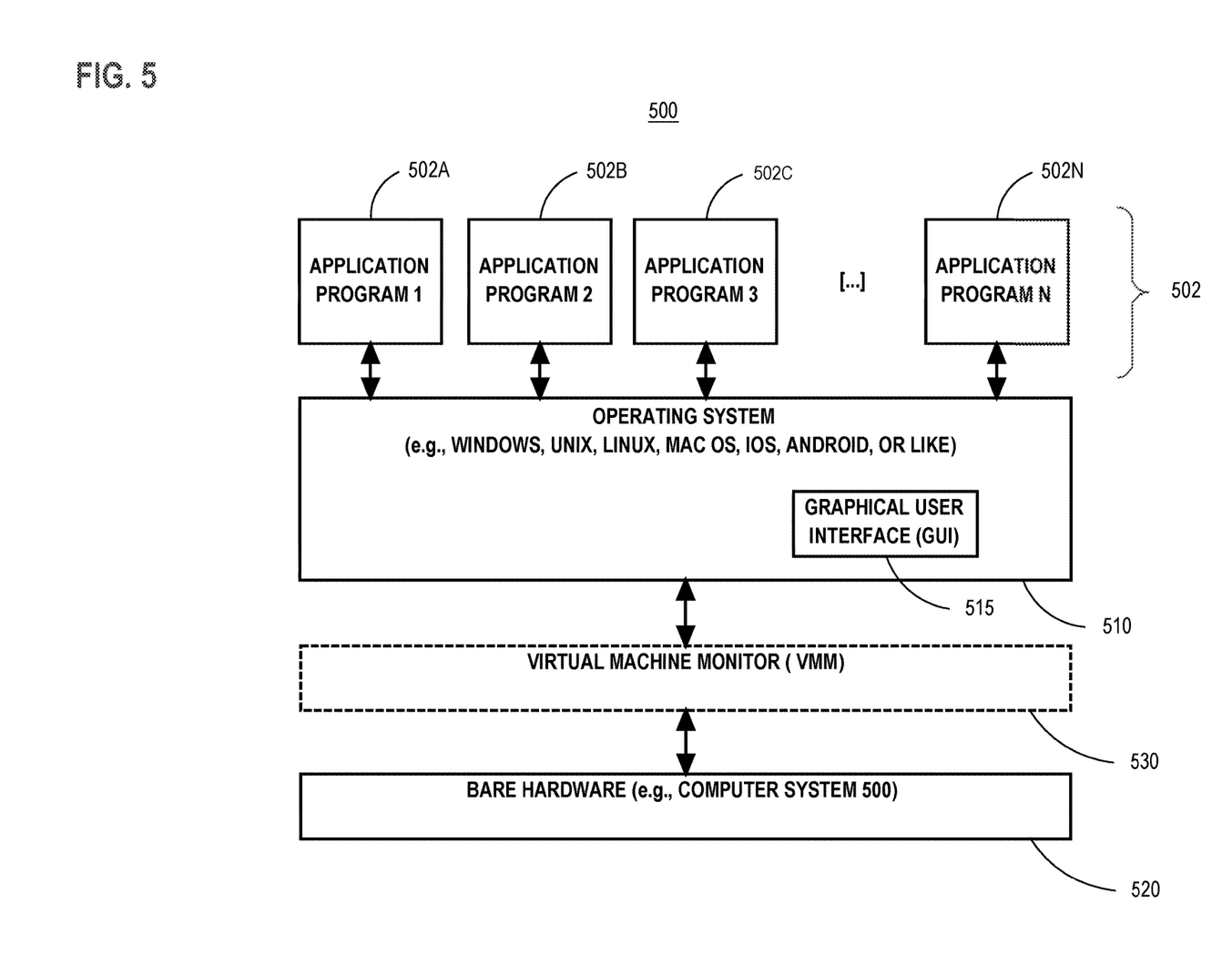
FIG. 5 is a diagram depicting a software system upon which an embodiment of the invention may be implemented.
Figure 6:
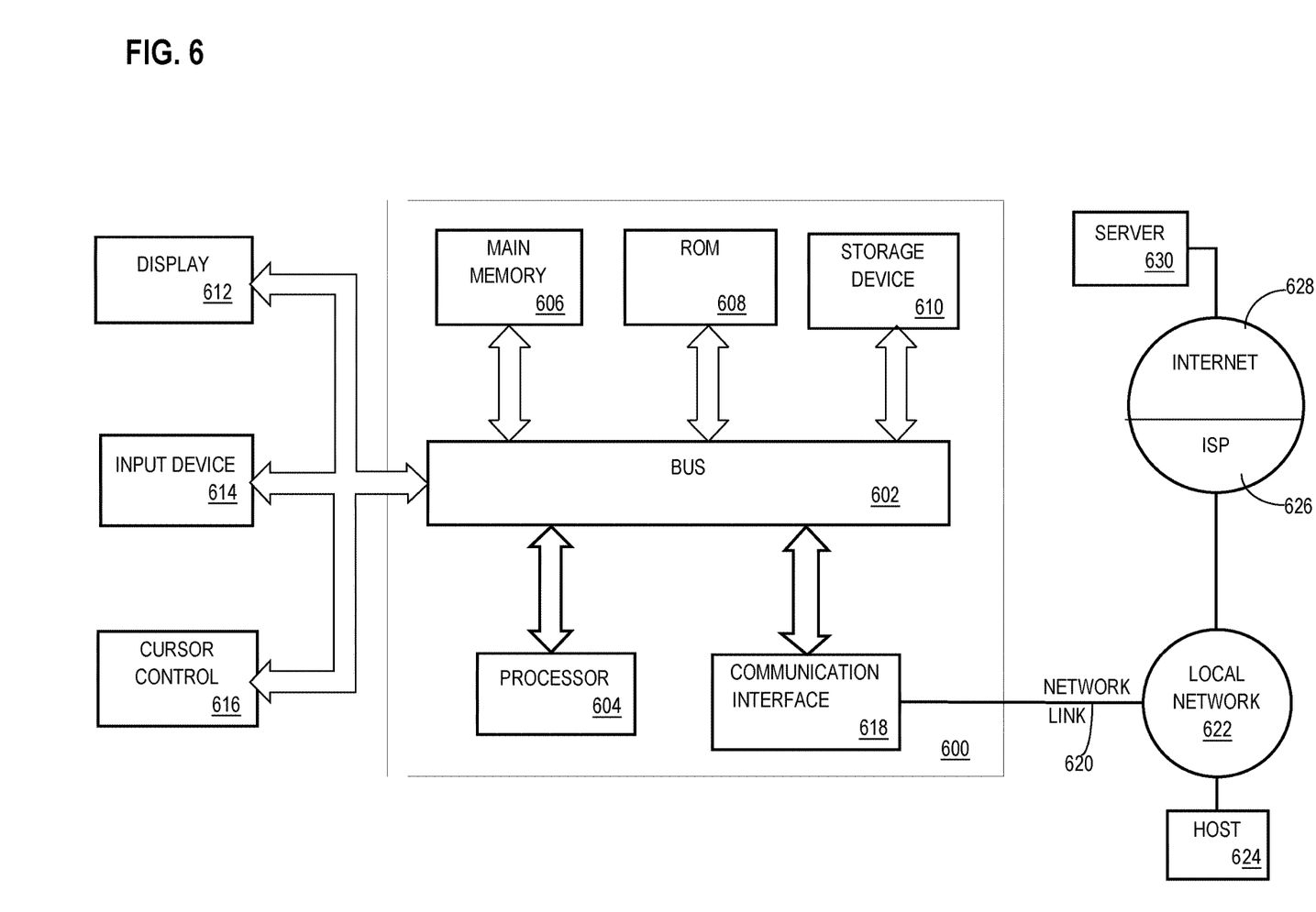
FIG. 6 is a diagram depicting a computer system that may be used in an embodiment of the present invention.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 402N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 604 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
 a plurality of database sessions executing within a database server that is executing within a single operating system instance and that is managing a container database (CDB) comprising a plurality of pluggable databases (PDBs), wherein the plurality of database sessions include first database sessions assigned to a first network stack and second database sessions assigned to a second network stack, wherein said first database sessions provide access to a first PDB and said second database sessions provide access to a second PDB;
 receiving a first request for a connection to said first PDB;
 in response to receiving said request for a connection to said first PDB, establishing a first database session of said first database sessions, wherein establishing said first database session includes assigning said first network stack to said first database session;
 wherein a first database dictionary defines the first network stack for the first PDB;

said database server determining that the first network stack is defined for said first PDB by at least examining said first database dictionary;

said database server starting a listener process for the first PDB, wherein starting the listener process includes assigning said first network stack to said listener process;

wherein establishing said first database session includes said listener process spawning a database session process thereby assigning said first network stack to said first database session;

receiving a second request for a connection to said second PDB;

in response to receiving said second request for a connection to said second PDB, establishing a second database session of said second database sessions, wherein establishing said second database session includes assigning said second network stack to said second database session.

2. The method of claim 1, wherein said receiving a first request for a connection to said first PDB includes:
receiving said first request to connect to said first PDB at a connection manager associated with said database server;
forwarding, by the connection manager, the first request to connect to said first PDB to the listener process for the first PDB.

3. The method of claim 1, wherein the first network stack is a network namespace assigned to a database process of said first database session.

4. The method of claim 1, wherein the first request to connect to the first PDB is associated with a whitelisted application host and the second request to connect to the second PDB is associated with a whitelisted application host.

5. The method of claim 1, further comprising:
receiving a third request to connect to the first PDB;
in response to determining based on said first network stack that the third request to connect to the first PDB is associated with a restricted application host, denying the third request.

6. The method of claim 1, wherein the first database session is accessible by a first IP address through the first network stack and wherein the second database session is accessible by a second IP address through the second network stack.

7. The method of claim 1, wherein the first PDB is associated with a first plurality of database sessions and the second PDB is associated with a second plurality database sessions;
the method further comprising:
assigning the first plurality of database sessions to a first namespace;
assigning the second plurality database sessions to a second namespace.

8. The method of claim 1, wherein the database server operates under control of an operating system and the operating system is Linux, Windows, or Solaris.

9. One or more non-transitory computer-readable media storing instructions which, when executed by one or more computing devices, cause:
a plurality of database sessions executing within a database server that is executing within a single operating system instance and that is managing a container database (CDB) comprising a plurality of pluggable databases (PDBs), wherein the plurality of database sessions include first database sessions assigned to a first network stack and second database sessions assigned to a second network stack, wherein said first database sessions provide access to a first PDB and said second database sessions provide access to a second PDB;

receiving a first request for a connection to said first PDB;

in response to receiving said request for a connection to said first PDB, establishing a first database session of said first database sessions, wherein establishing said first database session includes assigning said first network stack to said first database session;

wherein a first database dictionary defines the first network stack for the first PDB;

said database server determining that the first network stack is defined for said first PDB by at least examining said first database dictionary;

said database server starting a listener process for the first PDB, wherein starting the listener process includes assigning said first network stack to said listener process;

wherein establishing said first database session includes said listener process spawning a database session process thereby assigning said first network stack to said first database session;

receiving a second request for a connection to said second PDB;

in response to receiving said second request for a connection to said second PDB, establishing a second database session of said second database sessions, wherein establishing said second database session includes assigning said second network stack to said second database session.

10. The one or more non-transitory computer-readable media of claim 9, wherein said receiving a first request for a connection to said first PDB includes:
receiving said first request to connect to said first PDB at a connection manager associated with said database server;
forwarding, by the connection manager, the first request to connect to said first PDB to the listener process for the first PDB.

11. The one or more non-transitory computer-readable media of claim 9, wherein the first network stack is a network namespace assigned to a database process of said first database session.

12. The one or more non-transitory computer-readable media of claim 9,
wherein the first request to connect to the first PDB is associated with a whitelisted application host and the second request to connect to the second PDB is associated with a whitelisted application host.

13. The one or more non-transitory computer-readable media of claim 9, wherein the instructions, when executed by the one or more computing devices, further cause:
receiving a third request to connect to the first PDB;
in response to determining based on said first network stack that the third request to connect to the first PDB is associated with a restricted application host, denying the third request.

14. The one or more non-transitory computer-readable media of claim 9, wherein the first database session is accessible by a first IP address through the first network stack and wherein the second database session is accessible by a second IP address through the second network stack.

15. The one or more non-transitory computer-readable media of claim 9, wherein the first PDB is associated with a first plurality of database sessions and the second PDB is associated with a second plurality database sessions;

wherein the instructions, when executed by the one or more computing devices, further cause:
  assigning the first plurality of database sessions to a first namespace;
  assigning the second plurality database sessions to a second namespace.

16. The one or more non-transitory computer-readable media of claim 9, wherein the database server operates under control of an operating system and the operating system is Linux, Windows, or Solaris.

* * * * *

UNITED STATES PATENT AND TRADEMARK OFFICE
CERTIFICATE OF CORRECTION

PATENT NO. : 11,188,555 B2
APPLICATION NO. : 16/157015
DATED : November 30, 2021
INVENTOR(S) : Shilimkar et al.

Page 1 of 1

It is certified that error appears in the above-identified patent and that said Letters Patent is hereby corrected as shown below:

In the Specification

In Column 7, Line 5, delete ""PID"" and insert -- "PID" --, therefor.

In Column 10, Line 25, delete "402N," and insert -- 502N, --, therefor.

In Column 12, Line 5, delete "DbaaS" and insert -- DBaaS --, therefor.

In the Claims

In Column 15, Line 49, in Claim 7, after "plurality" insert -- of --.

In Column 15, Line 54, in Claim 7, after "plurality" insert -- of --.

In Column 16, Line 67, in Claim 15, after "plurality" insert -- of --.

In Column 17, Line 5, in Claim 15, after "plurality" insert -- of --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*